March 25, 1924.
N. L. ABERCROMBIE
1,488,140
BOLL WEEVIL EXTERMINATING MACHINE
Filed June 22, 1923    2 Sheets-Sheet 1
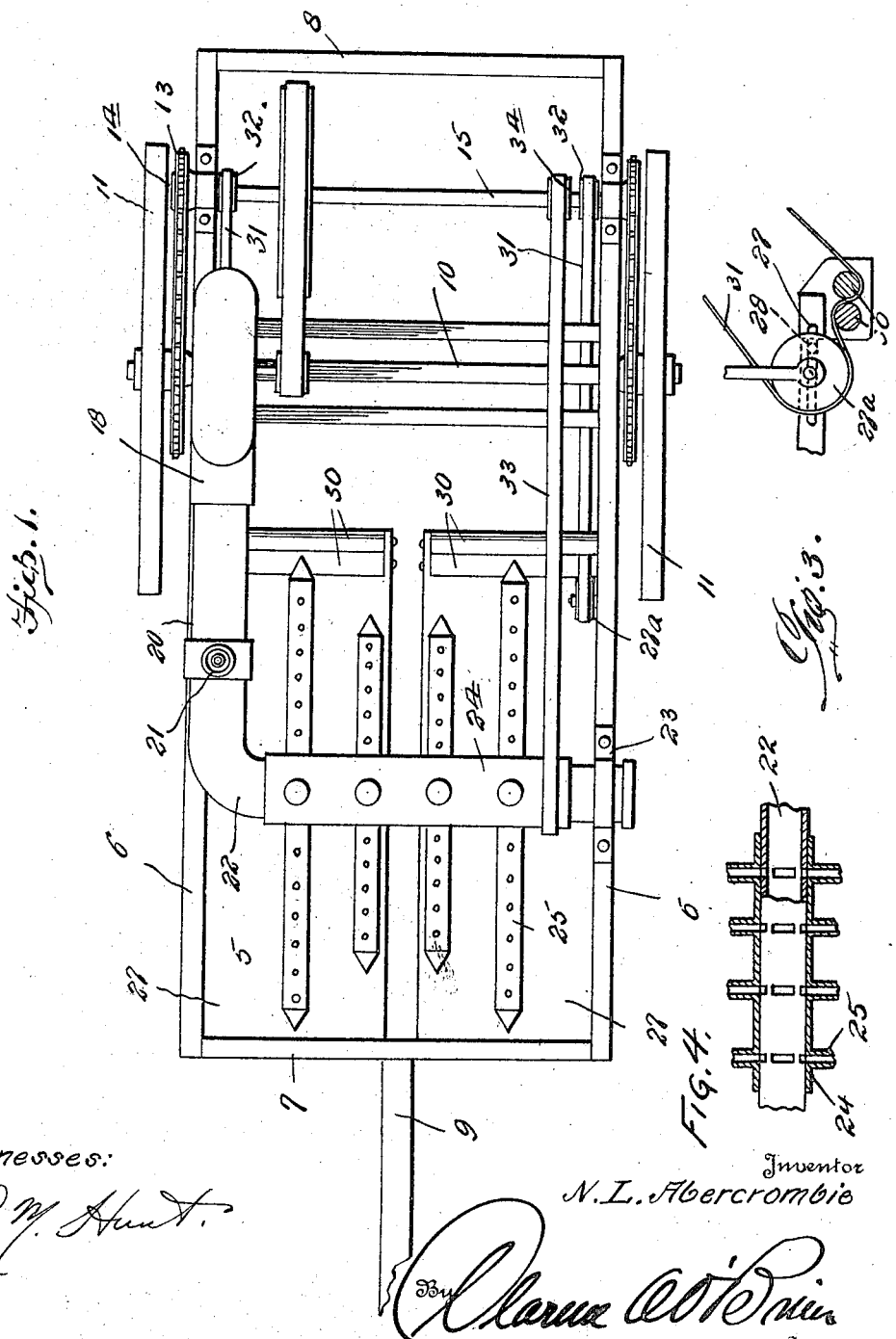

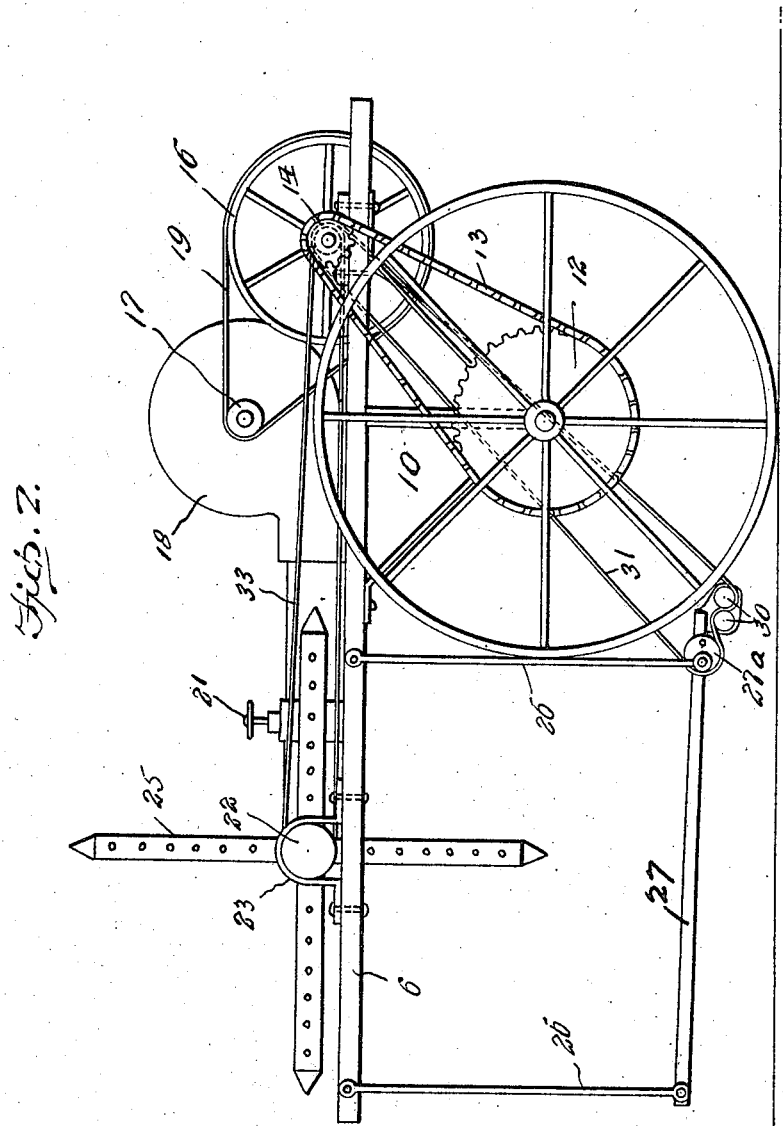

Patented Mar. 25, 1924.

1,488,140

UNITED STATES PATENT OFFICE.

NEWTON LEONIDAS ABERCROMBIE, OF MERIDIAN, MISSISSIPPI.

BOLL-WEEVIL-EXTERMINATING MACHINE.

Application filed June 22, 1923. Serial No. 646,991.

*To all whom it may concern:*

Be it known that I, NEWTON L. ABERCROMBIE, a citizen of the United States, residing at Meridian, in the county of Lauderdale and State of Mississippi, have invented certain new and useful Improvements in Boll-Weevil-Exterminating Machines, of which the following is a specification.

In carrying out the present invention, it is my purpose to provide a machine wherein boll weevils are effectively projected off of cotton plants by blasts of air, and then crushed through rolls for effectively exterminating the same.

The primary object of my invention is the provision of such a machine that is comparatively simple of construction, and one that may be operated to advantage by even those unskilled in the art, the machine embracing at the same time. the desired features of efficiency and durability, and one that is not liable to readily become out of order.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a top plan view of my improved machine, and

Figure 2 is a side elevation thereof.

Figure 3 is a detail view showing the arrangement of the crushing rollers with respect to the ends of the platform.

Figure 4 is a detail sectional view showing the manner in which air from the blower flows through the rotating drum into the tubes carried thereby.

Now, having particular reference to the drawings, my exterminating machine embodies a frame 5 that includes spaced parallel side bars 6 and front and rear connecting bars 7 and 8, respectively, the said front connecting bars 7 having secured thereto, one end of a tongue 9, wherein the machine can be pulled over the ground.

Adjacent the rear end of the frame 5 is an arched axle 10 upon the opposite ends of which are freely rotatable supporting and traction wheels 11. The hubs of each of said wheels 11 are formed adjacent the machine frame 5 with relatively large sprocket wheels 12, over which are trained sprocket chains 13, which are also trained over sprocket wheels 14 upon the opposite ends of a rotary shaft 15, which is suitably journaled upon the frame bars 6—6 adjacent the rear end thereof.

Keyed to this shaft 15 at a desirable point thereon is a relatively large pulley wheel 16 in direct alinement with which is a smaller pulley wheel 17, upon one end of the usual fan shaft of a desirable form of blower 18, that is suitably mounted upon the frame. Trained over said pulleys 16 and 17 is an endless belt 19 whereby the said fan shaft of the blower is rotated during the rotation of the shaft 15.

The outlet of the blower 18 is in communication with one end of a relatively large pipe 20 that extends forwardly upon the frame 5, and is equipped with a cut off valve 21. This pipe 20 is then extended transversely across the frame 5 as at 22, and is anchored at its end to the proper one of the frame bars 6 by a metallic strap 23.

Freely rotatable upon the transverse portion 22 of said pipe 20 is a drum 24, that is provided with preferably four series of radiating hollow tubes 25 that are formed with numerous perforations as more clearly shown in the drawings. The transverse portion 22 of said pipe 20 within the drum 24 is formed with openings, whereby as the drum is rotated, the air from the blower 18 will be projected outwardly through said tubes 25.

Supported beneath the tubes 25 by rods 26 is a pair of slightly spaced forwardly inclined platforms 27. The front ends of these platforms are loosely connected with the foremost rods 26, these rods being in turn loosely connected at their upper ends with the frame bars 6 of the machine. The rearmost supporting rods 26 are also loosely connected at their upper ends to the frame bars 6, and the outermost ones of these rear rods 26 are equipped with pulleys 27. Projecting inwardly from the face of these pulleys 27 is an eccentric pin 28 that engages within a slot 29 upon the adjacent edges of the platforms, whereby when said pulleys are rotated, these platforms will be vibrated.

Properly journaled beneath the rear end of each platform 27 is a pair of crushing rollers 30, which may be mounted in bearing plates carried by the platform or in any other suitable manner and trained over the pulleys 27 as well as said crushing rollers 30 upon opposite sides of the machine are endless belts 31 that are in turn trained over pulleys 32 adjacent opposite ends of said shaft 15.

As a means for imparting a rotation to the above described drum 24, an additional endless belt 33 is provided that is trained over one end of said drum, as well as a pulley 34 also upon the shaft 15.

In view of the above description, it will at once be apparent that in the operation of my machine, the cotton plants engage between the platforms 27, and as the machine is being moved over the ground, blasts of air in the tubes 25 will be directed onto the plants for thereby removing the insects therefrom. The insects dropping upon the platforms 27 will be forced rearwardly thereon, due to the vibration of the platforms, and will pass between the rollers 30, and be effectively crushed.

Even though I have herein shown and described the most practical embodiment of the invention, it is nevertheless to be understood, that minor changes may be made therein, without departing from the spirit and scope of the invention as claimed.

Having thus described my invention, what I claim as new, and desire to secure by Letter-Patent, is:

1. A machine of the class described including a wheel supported frame, a pipe mounted transversely at the forward end of the said frame, a drum rotatable on said pipe having a plurality of perforated tubes extending radially therefrom, the inner ends communicating with the interior of the pipe, a blower mounted on said frame having the outlet connected with the pipe for supplying air thereto, driving connections between the wheels of the frame and the blower for operating said blower, and insect catching platforms mounted below the drums and radial tubes having means for destroying the insects caught thereon, and a driving connection between the drum and the wheels of said frame for rotating the drum in the movement of the frame over the ground, whereby the blower will force jets of air outwardly through said perforated pipes on said drum in the forward movement of the frame over the ground and in the rotating movement of said drum for blowing insects from all parts of plants passing under said frame which are subsequently caught and crushed.

2. A device of the class described comprising a wheeled supported frame, a pipe mounted transversely and horizontally on said frame, a drum having a plurality of perforated tubes extending radially therefrom rotatably mounted on said pipe, the tubes being adapted for communication with the interior of the pipe, a driving connection between the wheels of the frame and the drum for rotating said drum in the movement of the frame over the ground, frame carried means for supplying air to said pipe to be subsequently forced out of the perforations in said tubes, and insect catching and destroying means mounted on the frame under said drum.

3. A device of the class described comprising a wheel carried frame, horizontally rotatable blowing means mounted transversely of said frame, a pair of insect catching platforms having adjacent side edges slightly spaced and extending longitudinally of the frame, said platforms being pivotally supported at the forward ends on said frame, means for supporting the rear ends of the platform, said means rotatable relative to the frame for transmitting a vibratory movement to the platform for conveying insects to the rear ends of said platform, crushing means located at the rear ends to the platform for receiving and crushing the insects therefrom, a shaft rotatably mounted on a frame transversely thereof having a driving connection with the wheels of the frame for rotating said shaft, and driving connections between said shaft, the blowing means, the means for vibrating the platform, and the crushing means for transmitting power from said shaft to each of said means in the movement of the frame over the ground.

In testimony whereof I affix my signature.

NEWTON LEONIDAS ABERCROMBIE.